United States Patent [19]

Timmermans et al.

[11] Patent Number: 4,551,655
[45] Date of Patent: Nov. 5, 1985

[54] TELEVISION LINE DEFLECTION CIRCUIT

[75] Inventors: Franciscus W. A. Timmermans, Breda, Netherlands; Frederik J. Van Roessel, Upper Saddle River, N.J.

[73] Assignee: U.S. Philips Corporation, New York, N.Y.

[21] Appl. No.: 438,125

[22] Filed: Nov. 1, 1982

[30] Foreign Application Priority Data

Nov. 2, 1981 [NL] Netherlands ................ 8104947

[51] Int. Cl.⁴ ............................................. H01J 29/56
[52] U.S. Cl. ..................................... 315/370; 358/60
[58] Field of Search ................ 315/370, 371, 368; 358/60, 74, 243

[56] References Cited

U.S. PATENT DOCUMENTS

| | | | |
|---|---|---|---|
| 3,309,560 | 3/1967 | Popodi | 315/370 |
| 3,403,289 | 9/1968 | Garry | 315/370 X |
| 3,440,483 | 4/1969 | Kaashoek et al. | 315/370 X |
| 3,487,164 | 12/1969 | Eggert | 315/370 |
| 3,670,199 | 6/1972 | Hawes | 315/370 |
| 3,714,496 | 1/1973 | Horvath | 315/370 X |
| 3,737,570 | 6/1973 | Eckenbrecht | 315/370 X |
| 3,757,161 | 9/1973 | Kline | 315/370 X |
| 3,763,393 | 10/1973 | White | 315/370 |
| 3,879,636 | 4/1975 | Lamoureux | 315/371 |
| 4,064,406 | 12/1977 | Tiemeijer | 315/371 X |
| 4,166,237 | 8/1979 | Van Roessel | 315/370 |
| 4,396,901 | 8/1983 | Saitou et al. | 315/370 X |

OTHER PUBLICATIONS

Anderson et al., Calibration of Flying-Spot Scanner, IBM Technical Disclosure Oct. 1967, pp. 612–616.

Primary Examiner—Theodore M. Blum
Assistant Examiner—Brian S. Steinberger
Attorney, Agent, or Firm—Thomas A. Briody; William J. Streeter; Leroy Eason

[57] ABSTRACT

A television line deflection circuit for recording or display, comprising a main and an auxiliary deflection signal generator. The main deflection signal generator applies a line-periodic, pulse-shaped voltage to a series arrangement of a deflection coil and a transformer winding. Of a further transformer winding a first terminal is connected to an auxiliary deflection signal generator terminal carrying a varying voltage and a second terminal is connected via a diode to a terminal carrying a reference voltage. A capacitor may be provided in parallel with the diode. An auxiliary deflection voltage which varies in a desired manner results in the desired scan, it being possible to employ for linearity correction a voltage which varies step-wise at intervals during line scanning periods and is, for example, generated by a microprocessor.

9 Claims, 3 Drawing Figures

TELEVISION LINE DEFLECTION CIRCUIT

The invention relates to a television line deflection circuit suitable for deflecting an electron beam which scans a pick-up target plate or a display screen, the circuit comprising a main deflection signal generator and an auxiliary deflection signal generator, the main deflection signal generator being intended to produce a line-periodic pulse-shaped voltage and being coupled to a series circuit comprising a deflection coil and a first winding of a transformer, the auxiliary deflection signal generator incorporating an amplifier circuit coupled to a second winding of the transformer, the auxiliary deflection signal generator being intended to produce an auxiliary deflection current in the deflection coil to obtain a desired scan of the pick-up target plate or the display screen. The circuit may be used in both television receivers and television cameras, in one case to scan the picture display tube and in the other to scan the picture pick up tube.

BACKGROUND OF THE INVENTION

Such a deflection circuit suitable for deflecting an electron beam scanning a pick-up target plate is disclosed in U.S. Pat. No. 4,166,237. In said patent the auxiliary deflection is effected to perform a linearity correction to eliminate the influence on the scanning operation of temperature fluctuations occurring in a supply transistor incorporated in the main deflection signal generator.

SUMMARY OF THE INVENTION

The invention has for its object to provide a television line deflection circuit for television recording and display wherein any desired scan of target plate or display screen can be obtained in a simple way. The invention provides a television line deflection circuit having a deflection coil in series with a first winding of a transformer. A first terminal of the second winding of the transformer is connected to a first auxiliary deflection signal generator terminal. to supply a deflection voltage which varies in a desired manner during line scanning periods. A second terminal of the second winding of the transformer is connected through a diode to a second, common, reference voltage-carrying terminal of the auxiliary deflection signal generator.

In order to prevent distortion of a line flyback pulse from occurring owing to the use of the transformer and the diode, a capacitor may be advantageously connected in parallel with the diode.

A line deflection circuit having an auxiliary deflection of the greatest possible variation can be obtained in a simple way. The auxiliary deflection signal generator incorporates a microprocessor having an output terminal coupled to the first auxiliary deflection signal generator terminal through the amplifier circuit.

To obtain auxiliary deflection which results in a linearity correction, the auxiliary deflection signal generator may be arranged to apply a deflection voltage which varies step-wise at intervals during line scanning periods to the first terminal. The stepped auxiliary deflection voltages result in auxiliary deflection currents in the deflection coil which vary linearly with different slopes.

To obtain a compensation of the influence of the temperature on the voltage drop across the diode, the amplifier circuit in the auxiliary deflection signal generator may comprise a feedback amplifier, and a biased diode being in the feedback path.

Because of its simple structure, the television line deflection circuit in accordance with the invention can advantageously be used for performing different auxiliary deflections in the distinct sub-regions. A microprocessor incorporated in the auxiliary deflection signal generator can apply sequentially and step-wise during each line scanning period a number of correction values, for example six, to the amplifier circuit which in response thereto produces an auxiliary deflection voltage having the same number of steps in the line scanning period. One specific step in the sequence of steps in a line scanning period may further have a different value than the corresponding steps in the next line scanning period. In addition, the d.c. voltage component may vary in consecutive line scanning periods. For a more detailed description of a possible embodiment of the combination of the microprocessor and the amplifier circuit controlled thereby for producing the voltage which varies, for example step-wise during the line scanning period, reference is made to Applicants' European patent application No. 0048066 and its U.S. counterpart Ser. No. 296,657, filed Aug. 27, 1981.

DESCRIPTION OF THE FIGURES

Embodiments of the invention will now be described, by way of example, with reference to the accompanying drawings, in which:

FIG. 3 shows an embodiment of an amplifier circuit suitable for use in the auxiliary deflection signal generator in the circuit of FIG. 1.

DESCRIPTION OF THE PREFERRED EMBODIMENT

Figure 1:
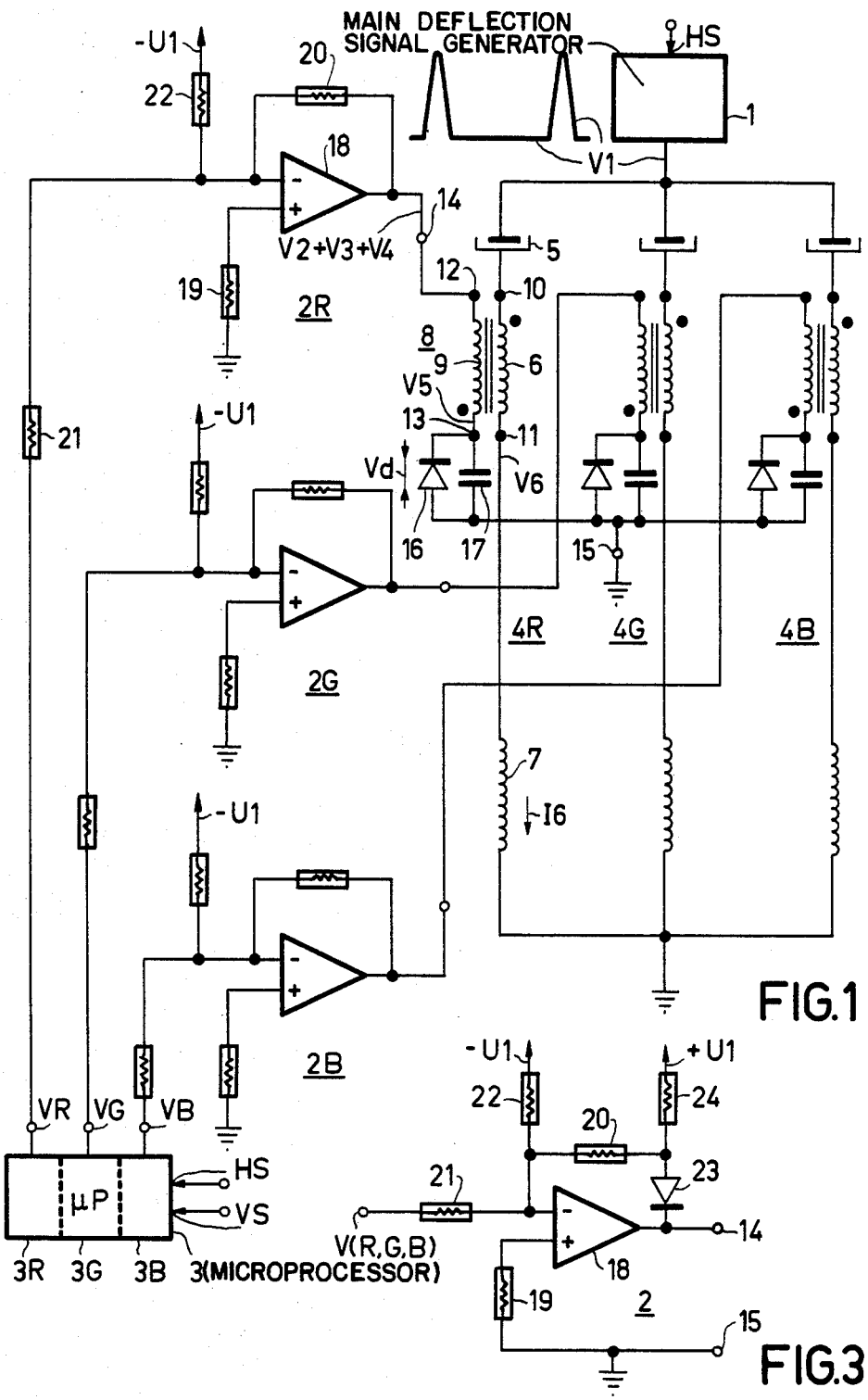
FIG. 1 shows an embodiment of a line deflection circuit in accordance with the invention suitable for use in color television.

In the embodiment of a color television line deflection circuit shown in FIG. 1 reference numeral 1 denotes a main deflection signal generator. When a line synchronizing signal HS is applied thereto, an output of the generator 1 supplies the voltage V1 shown next to it in FIG. 1. The voltage V1 is shown in FIG. 1 as having a line-periodic pulse-shaped waveform. The circuit of FIG. 1 further comprises three amplifier circuits 2R, 2G and 2B and a microprocessor 3. Three portions of the microprocessor 3 are indicated by 3R, 3G and 3B, each having an output terminal for applying a control voltage VR, VG or VB to the respective amplifier circuits 2R, 2G and 2B. The line synchronizing signal HS and a field synchronising signal VS are applied to the microprocessor 3. Thus, three auxiliary deflection signal generators (2R, 3R), (2G, 3G) and (2B, 3B) are present, which are each individually coupled to three series circuits 4R, 4G and 4B, respectively, which are all coupled to the main deflection signal generator 1. In an embodiment of the line deflection circuit for black-white television a single auxiliary deflection signal generator (2, 3) and the main deflection signal generator 1 would be coupled to a single series circuit 4. As the three series arrangements 4 and the auxiliary deflection signal generators (2, 3) shown in FIG. 1 are of an identical construction only the series circuit 4R and the generator (2R, 3R) will now be further described. The series circuit 4R comprises a capacitor 5, a transformer winding 6 and a deflection coil 7, arranged in series between the output of the generator 1 producing a voltage V1 and ground. The deflection coil 7 is intended, in a manner not shown, for the television line deflection of an electron beam which scans a pick-up target plate on recording or a display screen on display. The capacitor 5 is provided for the purpose of blocking the direct current, for which a transformer, not shown, might alternatively be used. Both components may be omitted if the generator 1 is further employed for producing an (adjustable) direct current through the deflection coil 7. The components of the series circuit 4 may be arranged in any sequence, for example the transformer winding 6 may be connected between the deflection coil 7 and ground.

Figure 2:
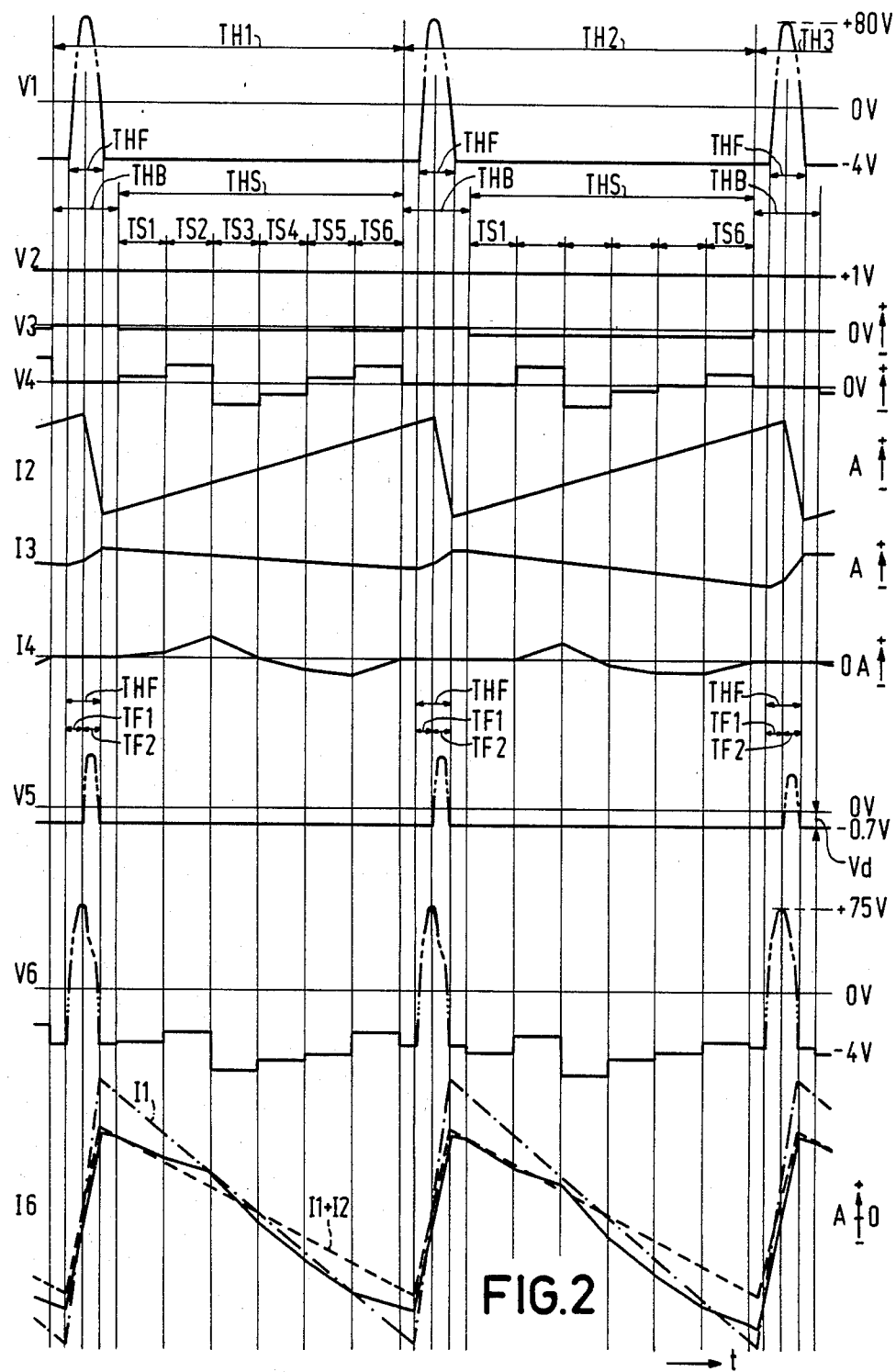
FIG. 2 shows voltage and current waveforms as a function of the time which, in operation, occur within the circuit shown in FIG. 1 and which are useful in explaining its operation.

The transformer winding 6 forms part of a transformer 8, which further comprises a second winding 9. The first winding 6 has first and second terminals 10 and 11 and the second winding 9 has first and second terminals 12 and 13. The winding sense is indicated in the customary manner by dots near the terminals 10 and 13. As a result of the winding sense chosen, when the transformer 8 is in operation, the voltages occurring at the terminals 10 and 13 have the same polarity. The terminals 10 and 11 are connected to the capacitor 5 and the deflection coil 7, respectively. The terminal 12 is connected to a first terminal 14 of the auxiliary deflection signal generator (2R, 3R), reference numeral 15 denoting a second terminal which is connected to ground and further forms part of, for example, the identical generators (2G, 3G) and (2B, 3B), and functions as the second terminal thereof. The terminal 13 is connected to the terminal 15 through a parallel circuit of a diode 16 and a capacitor 17. In this situation, in the embodiment shown in FIG. 1, the anode of the diode 16 is connected to the terminal 15, which carries the ground potential as a reference voltage. If the voltage polarities and/or a winding sense at the transformer 8 are reversed, the cathode of the diode 16 will be connected to the terminal 15. FIG. 1 shows that in the conductive state of the diode 16 this diode has a voltage drop Vd which is, for example, equal to 0.7 V. In the generator (2R, 3R) the terminal 14 is connected to the output of a differential amplifier 18. An (+) input of the amplifier 18 is connected to ground through a resistor 19. An (−) input of the amplifier 18 is connected to the output thereof through a resistor 20, to the terminal of the microprocessor 3 which carries a control voltage VR through a resistor 21, and to a supply terminal on which a voltage −U1 is present through a resistor 22. The voltage −U1 which is, for example, equal to −5 V is obtained from a voltage source, not shown, a further terminal of which is assumed to be connected to ground. The auxiliary deflection signal generator (2R, 3R) (and each individual generator of the identical generators (2G, 3G) and (2B, 3B)) is thus provided with an amplifier circuit 2R which incorporates the amplifier 18 and the resistors 19 to 22, inclusive. The circuit 2R applies a (positive) voltage denoted by V2+V3+V4 to the terminal 14. The voltages V1, V2, V3 and V4 mentioned in the description of FIG. 1 are plotted as a function of the time t in FIG. 2. In addition, voltages V5 and V6 such as they may appear at the terminal 13 and 11, respectively of FIG. 1 are plotted in FIG. 2. Furthermore FIG. 2 shows currents at various points in FIG. 1 as a function of the time t, which currents are denoted by I2, I3, I4 and I6, the current I6 (solid lines) flowing through the deflection coil 7 of FIG. 1. On the current waveform I6 there are further shown a current I1, by means of dot-and-dash lines and a current I1+I2, by means of dashed lines. The currents I1, I2, I3 and I4 caused by the voltages V1, V2, V3 and V4 are not individually indicated in FIG. 1 as was the current I6. Where possible in FIG. 2, the ground potential is indicated by 0 V and the current equal to zero is indicated by 0 A. The voltages and currents shown are not plotted to the same amplitude scale. By way of example it is shown in FIG. 2 that the voltage V1 has pulses from −4 V to +80 V.

FIG. 2 further shows some periods of time, such as a line scanning period THS, a line blanking period THB, a line fly-back period THF divided approximately into a first half TF1 and a second half TF2, and for example six periods of time TS1 to TS6, which may or may not be the same length into which the line deflection period THS is divided. The time deflection period THS may be divided into a greater or lesser number of periods. A line scanning period THS and a line blanking period THB constitute a line period TH. FIG. 2 shows two line periods TH1 and TH2 in their entirety and the beginning of a line period TH3. For simplicity of the drawing, the line fly-back period THF is shown in the center of the line deflection period THB, but this is not an absolute condition.

The voltages V3 and V4 shown in FIG. 2 are suitable for use with an embodiment of the auxiliary deflection signal generator (2, 3) such as can be derived from Applicants' European Patent Application No. 0048066, the voltage V4 having six steps in the line deflection period THS. The stepwise varying voltage V4, shown in FIG. 2, when applied across an imaginary coil would produce therein a current which is denoted by I4 in FIG. 2. It then holds that the sum of the positive and negative-going voltage steps in the voltage V4 is equal to 0 V over every line deflection period THS, so that at the end of each period of time TS6 the current I4 is equal to 0 A.

FIG. 1 shows the terminal 14 which not only carries the voltage V4, but also, superposed thereon, the voltages V2 and V3, shown in FIG. 2. The voltage V2 is a constant d.c. voltage which, as shown in FIG. 2, is, for example, equal to +1 V. The control voltage VR is here, for example, equal to 0 V. The resistors 20, 21 and 22 and the voltage −U1 have such values that for VR=0 V it holds that V2+V3+V4=+1 V. The voltage V2=+1 V, would, when present across the imaginary coil, produce therein a linearly varying current, as is shown in FIG. 2 as the current I2 during the line scanning period THS. In FIG. 2 the current I2 is shown as varying in a sawtooth-shaped manner over the line periods TH. This sawtooth-shaped variation is caused by the pulses in the voltage V5 which occur at the terminal 13. In this situation, disregarding the leakage inductance of the transformer 8', the deflection coil 7 operates as the imaginary coil mentioned in the foregoing. In FIG. 2, the current I1 which would flow in the coil 7 of FIG. 1 in response to the voltage V1 if the transformer 8 were absent, is shown as the current I6. For the case shown in FIG. 1, for which it holds that V2+V3+V4=V2=+1 V, the current I1+I2 shown in FIG. 2 as the current I6 would flow through the coil 7. In this situation the currents I1 and I2 (transformed) would vary in the coil 7 into the opposite sense, so that the current I1+I2 will have a smaller amplitude than the current I1. From the further description it will be clear that the current I1+I2 associated with V2+V3+V4=V2=+V1 corresponds to a zero correction during the scanning operation. It will further be clear that, relative to this zero-correction associated with the current I2 having a given amplitude value which is determined by the voltage V2=+1 V, a desired correction magnitude and correction direction is obtainable by adding or subtracting the auxiliary deflection currents (I3 and I4). Put differently: a preceding current subtraction (I2 relative to I1) may be increased or decreased (I3), as the case may be, a decrease to zero resulting in the maximum correction in one direction (amplitude of I1).

FIG. 2 shows the voltage V3 having a predetermined constant value for the duration of the entire line scanning period THS, the 0 V ground potential being present in the line blanking periods THB. The voltage V3 may be adjusted between +1 V and −1 V in a line scanning period THS. If it is assumed that the voltage V3 is present across an imaginary coil, a linearly varying current is produced therein as is shown at the current I3 of FIG. 2 during the line scanning periods THS.

Controlled from the microprocessor 3, the voltages V3 and V4 result in a voltage V3+V4 which is variable between +1 V and −1 V, it then being assumed that control voltages VR, VG and VB can vary between −3 V and +3 V, the voltage V2 (=+1 V)+V3+V4 varying between +2 V and 0 V. The auxiliary deflection currents I3 and I4 shown in FIG. 2, which are produced by voltages V3 and V4 can not be indicated individually in FIG. 1. The auxiliary deflection currents I3 and I4 are contained (transformed) in the deflection coil 7, superposed on the deflection current I1+I2 flowing therein. It can be seen that in the line scanning periods THS the voltages V1 and V2 result, in the deflection coil 7, in the (transformed) current I1+I2 corresponding to the zero-correction for the scanning operation which, when the transformed auxiliary deflection currents I3 and I4 are superposed on said current, results in the current I6 shown in FIG. 2 by means of solid lines.

The foregoing describes the operation of the line deflection circuit of FIG. 1 during the line scanning periods THS, the diode 16 being all the time in the conducting state. This is caused by the voltage induced in the winding 9 from the winding 6 of the transformer 8, which voltage is present with the negative polarity on the terminal 13. The diode 16 then carries a current which depends on the instantaneous voltage on the terminal 14. A possible voltage variation on the terminal 14 from +2 V to 0 V is mentioned. The voltage induced in the winding 6 should then be at least of such a value than no voltage less negative then 0.7 V (=Vd) is present on the terminal 13. The diode 16 would then be cutoff, which corresponds to the described maximum correction (amplitude of I1). In FIG. 2 the voltage V5 is shown in the form in which it is present in the correction range on the cathode of the diode 16.

During line blanking periods THB, during a first portion of the time thereof, the diode 16 remains conductive (voltage V5 shown in FIG. 2). Then currents flow through the winding 6 and 9 of the transformer 8 in corresponding directions. During approximately the first half (TF1) of the line fly-back periods THF the value of the current I6 through the deflection coil 7 decreases in response to the first half of the pulse in the main deflection voltage V1. Approximately midway through the line fly-back periods THF the zero value of the current is reached, the current direction then reversing in response to the second half of the pulse in the voltage V1. This causes the diode 16 to be cutoff. Together with the deflection coil 7 and the leakage inductance of the transformer 8, which may be neglected, the capacitor 17 constitutes a resonant circuit. This results in the occurrence of a pulse in the voltage V5 (FIG. 2) having a cosinusoidal variation. It is possible to omit capacitor 17 In practice this omission appears to result in a distortion of the line fly-back pulses. This distortion can be prevented from occurring by providing the capacitor 17. The pulse in the voltage V5 is present until approximately the end of the line flyback period THF when the pulse in the main deflection voltage V1 ends. Diode 16 can then become conducting again.

It can be seen that in the period of time TF2, which is equal to approximately the second half of the line flyback period THF the voltage V5 has a pulse which, transformed by means of the transformer windings 9 and 6, is present across the transformer winding 6 and is superposed on the pulse (voltage V1) produced by the generator 1. This results in the voltage V6 being the pulse produced by the generator 1 without modification during the period of time TF1 and modified during the period of time TF2 by the pulse V5. The result is an asymmetry as shown at the pulses in the voltage V6 of FIG. 2.

The peak value (+75 V) of the pulses in the voltage V6 is related to the magnitude of the deflection current I6 at the beginning of the line flyback period THF. For an explanation of the operation it is important to consider the instantaneous components of the current I6 separately. So there is the instantaneous value of the current I1, from which the value of the current I2 is subtracted. Depending on the sign of the auxiliary deflection the value of the current I3 is either subtracted from or added to the instantaneous value of the current I1. In addition, the instantaneous value of the current I3 is important at the end of the first half (TF1) of the line flyback period THF in determining the peak value of the pulses in the voltage V5. Let it now be assumed that at the end of the periods of time TF1 of the line periods TH1 and TH2 the same values of the imaginary current I3 are present in response to the same value of the voltage V3 during the preceding line scanning period THS. The associated pulses in the voltage V5 are then identical. The more negative value of the voltage V3 in the line scanning period THS of the line period TH2 results in a more negative current value in the current I3 at the end of the period of time TF1 of the line period TH3. Because of the associated increased pulse subtraction relative to the pulses associated with current components I1 and I2, a lower peak value of the pulse in the voltage V5 is produced. The asymmetry of the pulse in the voltage V6 has then become less.

In FIG. 2, the current I6 which flows through the deflection coil 7 is plotted by means of solid lines. This is based on the assumption that owing to the correction relative to the sawtooth (I1+I2) which is shown by means of a dashed line, and which may be assumed to be in a higher or a lower position, scanning by means of the coil 7 of a target plate or a display screen by an electron beam is effected in a more linear way.

The auxiliary deflection signal generator (2, 3) is then active in a predetermined step-wise pattern for the linearization of the scan. Alternatively the generator (2, 3) may be likewise employed to obtain special effects on recording or display. This may be accomplished by using suitable stepped patterns and/or other patterns in the voltage V4 (FIG. 2).

For a practical embodiment of the line deflection circuit the following component parameters are given in addition to the data already mentioned in the foregoing:

capacitor 5: 33 μF
deflection coil 7: 1 mH
transformer 8: transformation ratio windings 9 and 6 equal to 6:1
diode 16: type BY 207
capacitor 17: 390 pF.

FIG. 3 shows an alternative embodiment of the amplifier circuit 2 of FIG. 1 (having the same reference numerals) with which, if so desired, the influence of the temperature on the voltage drop Vd of the diode 16 of FIG. 1 can be compensated for. To that end, a diode 23 is provided between the output of the amplifier 18 and the resistor 20. The junction between the anode of the diode 23 and the resistor 20 is connected through a resistor 24 to a terminal carrying a voltage +U1 as a result of which the diode 23 operates as a biased diode.

It has been found that in practice good performance of the auxiliary deflection by means of the line deflection circuit shown in FIG. 1 which comprises the transformer 8, the diode 16 and, possibly, the capacitor 17 is possible. It is advantageous to provide the auxiliary deflection signal generator (2, 3) with the microprocessor 3, which can be used in a simple way for generating complex wave forms to produce the most diverse auxiliary deflections.

What is claimed is:

1. A television line deflection circuit for deflecting an electron beam comprising:
   a main deflection signal generator for supplying a line periodic pulse shaped voltage to a deflection coil;
   a transformer having a first and a second winding;
   a deflection coil;
   said main deflection signal generator, transformer first winding, and deflection coil connected to form a series circuit; and
   an auxiliary deflection signal generator means for producing an auxiliary deflection current, having an amplifier circuit connected to a first end of said second winding to supply a line deflection correcting signal, and a second end of said second winding connected through a diode to a common terminal of said auxiliary deflection signal generator; whereby said auxiliary deflection circuit in response to an input signal which changes level in steps, supplies a stepwise change in current in said deflection coil, correcting the linearity of line deflection of said electron beam.

2. A television line deflection circuit as claimed in claim 1, further comprising a capacitor connected in parallel with the diode.

3. A television line deflection circuit as claimed in claim 1 or claim 2, wherein the auxiliary deflection signal generator means is connected to a microprocessor, an output terminal of which is coupled to the auxiliary deflection signal generator amplifier circuit input terminal.

4. A television line deflection circuit as claimed in claim 1 or 2, wherein the auxiliary deflection signal generator means provides a deflection voltage, which varies step-wise at intervals during line scanning periods, to the first end of said second winding.

5. A television line deflection circuit as claimed in claim 1 or 2 wherein the amplifier circuit in the auxiliary deflection signal generator comprises a feedback amplifier, a biased diode being incorporated in the feedback path.

6. A television line deflection circuit as claimed in claim 3 wherein the auxiliary deflection signal generator means provides a deflection voltage, which varies step-wise at intervals during line scanning periods, to the first end of said second winding.

7. A television line deflection circuit as claimed in claim 3, wherein the amplifier circuit in the auxiliary deflection signal generator comprises a feedback amplifier, biased diode being incorporated in the feedback path.

8. A television line deflection circuit as claimed in claim 4, wherein the amplifier circuit in the auxiliary deflection signal generator comprises a feedback amplifier, a biased diode being incorporated in the feedback path.

9. A television line deflection circuit as claimed in claim 1 or 2, wherein the auxiliary deflection signal generator means provides a deflection voltage, which varies step-wise at intervals during line scanning periods, to the first end of said second winding; and the auxiliary deflection signal generator means is connected to a microprocessor, an output terminal of which is coupled to the auxiliary deflection signal generator amplifier circuit input terminal.

* * * * *